United States Patent [19]

Furuta

[11] Patent Number: 5,244,064
[45] Date of Patent: Sep. 14, 1993

[54] SHOCK ABSORBER
[75] Inventor: Takashi Furuta, Seki, Japan
[73] Assignee: Kayaba Kogyo Kabushiki Kaisha, Tokyo, Japan
[21] Appl. No.: 827,356
[22] Filed: Jan. 29, 1992
[30] Foreign Application Priority Data Jan. 31, 1991 [JP] Japan .................................. 2-9205

[51] Int. Cl.⁵ ............................ F16F 9/32; F16F 9/54
[52] U.S. Cl. ................................ 188/322.19; 280/668
[58] Field of Search ................. 188/313, 315, 321.11, 188/322.11, 322.12, 322.19; 280/668, 96.1

[56] References Cited

U.S. PATENT DOCUMENTS

| | | | |
|---|---|---|---|
| 3,958,673 | 5/1976 | Allinquant et al. | 188/315 X |
| 4,438,834 | 3/1984 | Handke et al. | 188/315 X |
| 4,527,781 | 7/1985 | Pees et al. | 188/315 X |
| 4,880,086 | 11/1989 | Knecht et al. | 188/315 X |

FOREIGN PATENT DOCUMENTS

| | | | |
|---|---|---|---|
| 23282 | 2/1981 | European Pat. Off. | 188/322.19 |
| 23968 | 2/1981 | European Pat. Off. | 188/322.12 |
| 3535287 | 4/1987 | Fed. Rep. of Germany | 188/315 |
| 14938 | 1/1991 | Japan | 188/321.11 |
| 1361399 | 12/1987 | U.S.S.R. | 188/315 |

Primary Examiner—Robert J. Oberleitner
Assistant Examiner—Alfred Muratori
Attorney, Agent, or Firm—McGlew and Tuttle

[57] ABSTRACT

The shock absorber of the present invention is provided with a piston which has a damping force generating mechanism and which partitions the interior of a cylinder into a rod-side chamber and a piston-side chamber; a piston rod with the piston mounted thereto, the piston rod being moved into and out of the cylinder, a base valve provided at an open end of the piston-side chamber in the cylinder; and an outer shell having a constant wall thickness throughout the overall length thereof and enclosing the outside of the cylinder to form a reservoir chamber. The outer periphery of a lower end portion of the outer shell is supported by a knuckle bracket, and a bottomed cylinder, having a cylindrical portion which cooperates with the thin-walled outer shell, is fitted in the lower end portion of the outer shell along the inner periphery thereof. In this state, the bottomed cylinder is welded together with the outer shell and the knuckle bracket.

4 Claims, 3 Drawing Sheets

SHOCK ABSORBER

BACKGROUND OF THE INVENTION

1. Field of the Invention

The present invention relates to an outer shell structure of a strut type shock absorber disposed between the body of a vehicle such as a four-wheeled vehicle and an axle thereof to damp vibrations from the surface of a road.

2. Description of the Prior Art

Between the body of a four-wheeled vehicle and an axle thereof is suspended a shock absorber for mitigating the transfer of vibration to the vehicle body side to ensure a stable running of the vehicle independently of running conditions, changes in the state of a road surface, etc. As shock absorbers of this type there are known, for example, those disclosed in Japanese Utility Model Publication No. 32035/1983, Japanese Utility Model Laid Open No. 16194/1980.

For example, out of the above conventional shock absorbers, the one disclosed in Japanese Utility Model Publication No. 32035/1983 has the structure shown in FIG. 3 attached hereto.

In FIG. 3, the reference numeral 1 denotes a cylinder; the numeral 2 denotes a piston provided with a damping force generating mechanism which piston partitions the interior of the cylinder 1 into a rod-side chamber and a piston-side chamber 4; numeral 5 denotes a piston rod; numeral 6 denotes an outer shell which encloses the outside of the cylinder 1 to define a reservoir chamber 7; numeral 8 denotes a base valve for imparting a damping force to a hydraulic oil flowing between the reservoir chamber 7 and the piston-side chamber 4; and numeral 9 denotes a bearing portion which closes the upper ends of the rod-side chamber 3 and the reservoir chamber 7 and holds the piston rod 5 for hermetic entrance and exit of the piston rod with respect to the interior of the cylinder 1. Further, numeral 10 denotes a lower cap provided at an end of the cylinder 1 so as to enclose the base valve 8, and numeral 11 denotes a knuckle bracket which supports the outer periphery of the lower end of the outer shell 6 and which is mounted on the axle side, the knuckle bracket 11 and the lower cap 10 being integrally connected with each other through a lower weld portion 12. Numeral 13 denotes a spring guide and numeral 14 denotes a seam weld portion. In order to obtain an optimum strength, i.e., strength against a bending moment load, of the portion of the outer shell 6 opposed to the knuckle bracket 11, despite of a light weight thereof, the outer shell 6 is smaller in its thickness on the side of the seam weld portion 14 and is sufficiently large in its thickness on the lower weld portion 12 side, according to a bending moment load distribution. As a whole, the outer shell is formed as a tapered pipe to attain the reduction in weight thereof.

In such conventional shock absorber, at the time of extension of the piston rod 5, the hydraulic oil in the rod-side chamber 3 flows to the piston-side chamber 4 through the damping force generating mechanism in the piston 2, and an extension-side damping force is generated at this time. On the other hand, during the compression stroke, the hydraulic oil in the piston-side chamber 4 flows to the rod-side chamber 3 through the above damping force generating mechanism, and at this time the hydraulic oil in the above stroke is allowed to flow between the piston-side chamber 4 and the reservoir chamber 7 through the base valve 8 to generate a compression-side damping force.

Since the conventional shock absorber is constructed as above, it is necessary to fabricate the outer shell 6 as a tapered pipe like the above or, if necessary, as a stepped pipe by drawing, thus requiring the use of special die and plug, resulting in that not only large-scaled equipment and power and plant investment are required but also the processing time and cost are increased.

SUMMARY OF THE INVENTION

It is an object of the present invention to provide a strut type shock absorber having an outer shell formed using a standard, inexpensive, thin-walled pipe of a certain thickness.

It is another object of the present invention to provide a strut type shock absorber which, despite of a light weight, can afford an optimum strength according to a bending moment load distribution.

It is a further object of the present invention to provide a strut type shock absorber easy to undergo processing and capable of decreasing the processing time and cost.

In order to achieve the above-mentioned objects, the shock absorber of the present invention includes a piston provided with a damping force generating mechanism which piston partitions the interior of a cylinder into a rod-side chamber and a piston-side chamber; a piston rod with the piston mounted thereto, the piston rod being moved into and out of the cylinder; a base valve provided in an open end of the piston-side chamber of the cylinder; and an outer shell having a small wall thickness which is constant throughout the overall length thereof, the outer shell enclosing the outside of the cylinder to form a reservoir chamber, in which shock absorber the outer periphery of a lower end portion of the outer shell is supported by a knuckle bracket, and a bottomed cylinder having a cylindrical portion which bears a maximum bending moment load in cooperation with the thin-walled outer shell is fitted in the outer shell along the inner periphery of the lower end portion of the outer shell and then welded together with the outer shell and the knuckle bracket.

The bottomed cylinder used in the above construction of the present invention also serves as the conventional lower cap which seals a hydraulic oil within the cylinder, and it is fitted in the outer shell along the inner periphery of a lower end portion of the outer shell which is thin-walled and then welded to the outer shell together with the knuckle bracket. Therefore, the end portion of the outer shell where a maximum bending moment load is generated can be reinforced in a simple construction easily and inexpensively.

DETAILED DESCRIPTION OF THE PREFERRED EMBODIMENT

An embodiment of the present invention will be described hereinunder with reference to FIG. 1.

Figure 1:
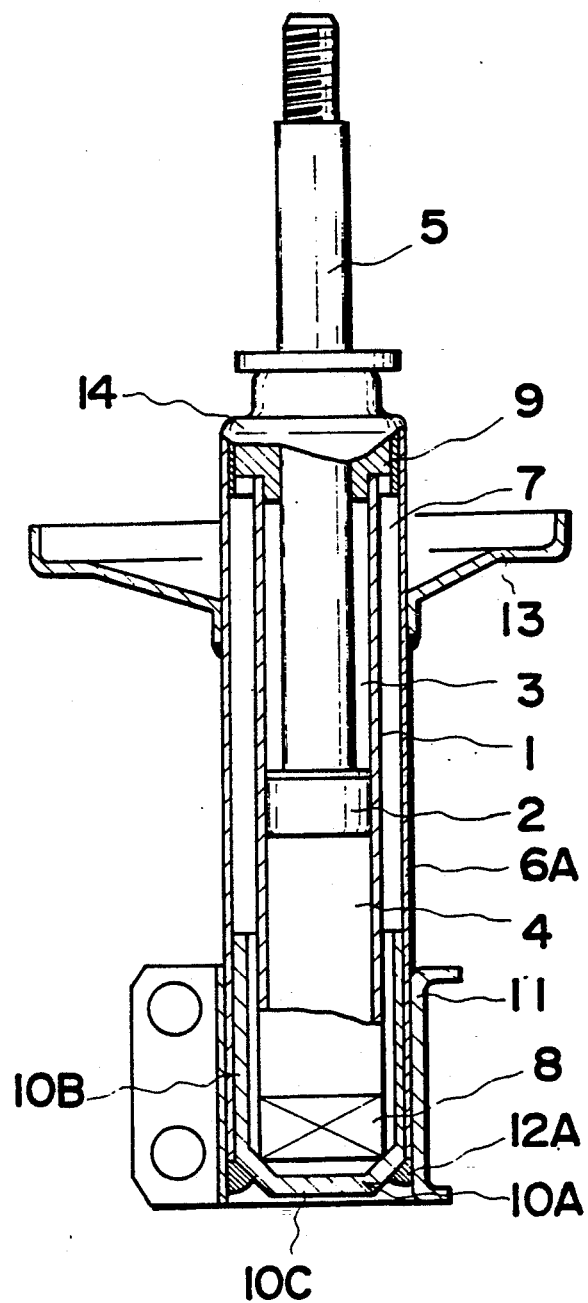
FIG. 1 is a front view, partially in longitudinal section, of a shock absorber according to an embodiment of the present invention.
Figure 3:
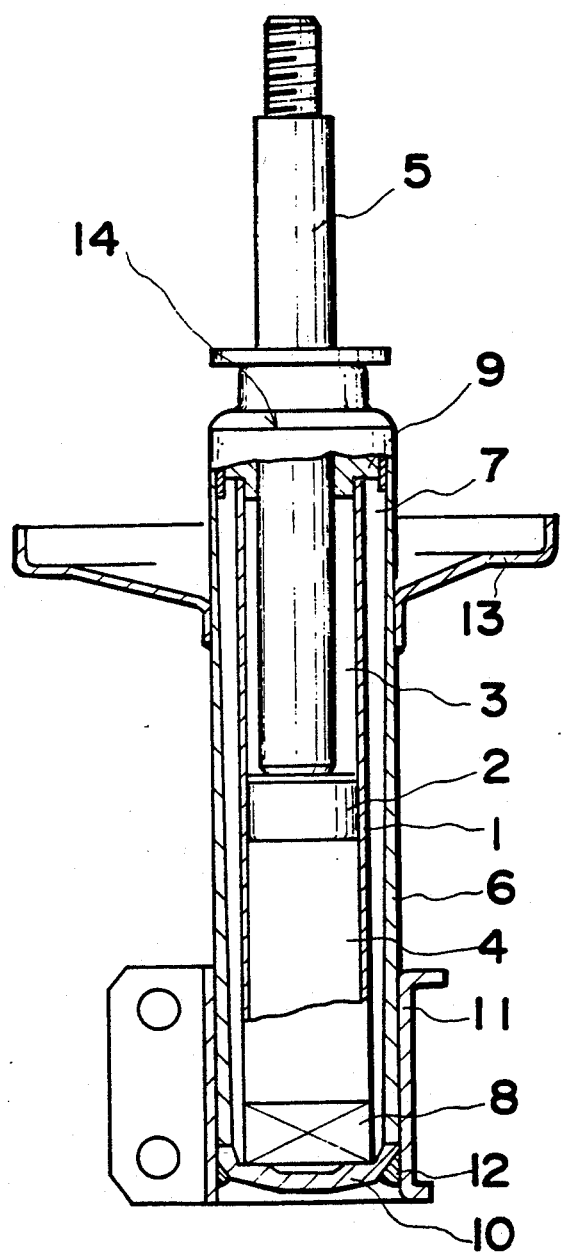
FIG. 3 is a front view, partially in longitudinal section, of a conventional shock absorber.

In FIG. 1, the reference numeral 6A denotes an outer shell formed using an ordinary thin-walled pipe and having a wall thickness which is constant throughout the overall length thereof, and the numeral 10A denotes a bottomed cylinder fitted in the outer shell 6A along the inner periphery of an end portion of the outer shell and over a predetermined axial length and welded integrally with the outer shell 6A and a knuckle bracket 11. The bottomed cylinder 10A comprises a cylindrical portion 10B which bears a maximum bending moment load in cooperation with the lower end portion of the outer shell 6A, and a bottom 10C used as a lower cap which seals the lower end of a cylinder 1. Numeral 12A denotes a weld portion. The cylindrical portion 10B of the bottomed cylinder 10A is also constant in its wall thickness. Other constructional portions which are the same as in FIG. 3 are indicated by the same reference numerals as in FIG. 3 and repeated explanations thereof will be omitted.

The shock absorber of this embodiment, like the one described above in connection with the prior art, generates a damping force during the extension stroke and compression stroke of a piston rod 5. In the shock absorber of this embodiment, the outer shell 6A is thin-walled throughout the overall length thereof to an extent capable of withstanding a predetermined bending moment load. At the portion of the outer shell 6A where the knuckle bracket 11 is mounted, there is generated a maximum bending moment load, so the bottomed cylinder 10A is fitted in an end portion of the outer shell 6A on the inner periphery side of the same shell, for example by press-fitting and then connected integrally with the outer shell 6A and the knuckle bracket 11 by welding, whereby the strength of the outer shell can be made sufficient, or optimal, despite of the lightest weight thereof. Thus, since the outer shell 6A is constituted by a commercially available thin-walled cylinder, it is light-weight, inexpensive and obtainable easily, so the shock absorber can be manufactured using an existing inexpensive welding apparatus without using any expensive equipment. Besides, since the assembly can be done merely by fitting and welding, the mounting efficiency can be improved and the quality can be made reliable.

Figure 2:
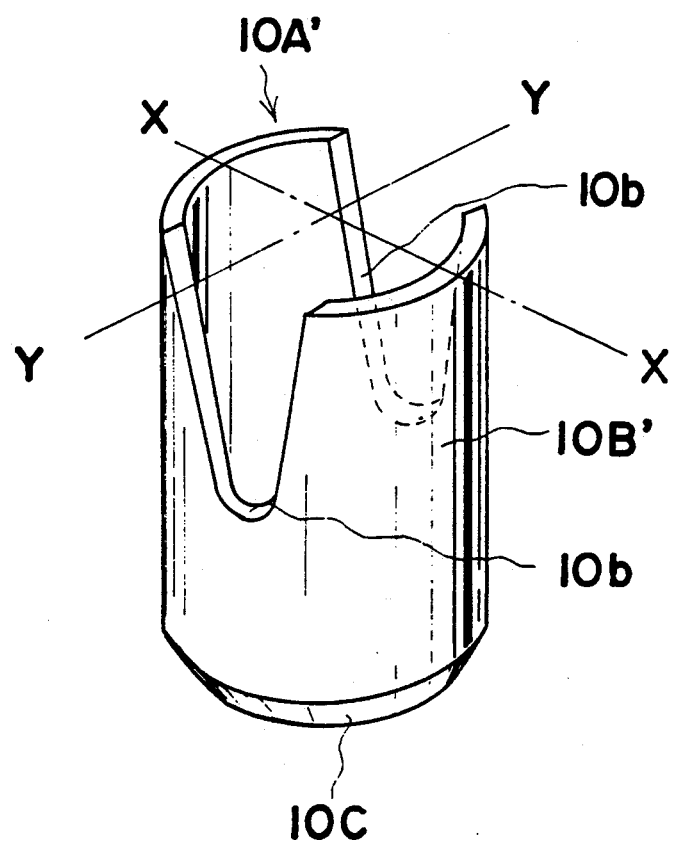
FIG. 2 is a perspective view of a bottomed cylinder.

Referring now to FIG. 2, there is illustrated another example of a bottomed cylinder. The cylindrical portion of this bottomed cylinder has cutouts, unlike the bottomed cylinder shown in FIG. 1.

In the case of a strut type shock absorber, the direction of a bending moment load is fixed. More particularly, a bending moment load acts in X—X direction passing through the axis and including a knuckle mounting bracket of the knuckle bracket 11. In the bottomed cylinder shown in FIG. 2, which is indicated at 10A', a cylindrical portion 10B' in the X—X direction is allowed to remain, while a cylindrical portion in Y—Y direction passing through the axis is cut out to form cutout portions 10D, 10D. Thus, a further reduction in weight corresponding to the cutout portions can be attained without affecting the required strength.

According to the present invention there are obtained the following effects.

Since a commercially available, standard, thin-walled pipe having a constant wall thickness throughout the overall length thereof including the upper portion small in the bending moment load is used as the outer shell, it is possible to attain the reduction of cost and weight, and it is not necessary to make processing of the outer shell. Besides, unlike the prior art, since it is not necessary to use a special die or plug for the formation of a tapered or stepped wall, it is possible to effect the saving of equipment and power, the reduction of cost and the increase of the processing speed.

Since there is adopted a double pipe structure wherein a bottomed cylinder having a cylindrical portion extending over a predetermined axial length is fitted in the outer shell along the inner periphery of a lower end portion of the shell where a maximum bending moment load is generated, a strength sufficient to bear the maximum bending moment load is obtained by an extremely simple method in cooperation with the cylindrical portion of the bottomed cylinder even if the outer shell is thin-walled.

The bottomed cylinder not only reinforces the outer shell and the knuckle bracket but also serves as a lower cap of the cylinder, and thus two functions can be attained by a single member.

What is claimed is:

1. A shock absorber, comprising:
   a cylinder;
   a piston provided with a damping force generating mechanism;
   a piston rod with said piston mounted thereto, said piston rod being moved into and out of said cylinder, said piston partitioning an interior of said cylinder into a rod-side chamber and a piston-side chamber;
   a base valve provided in an open end of said piston-side chamber of said cylinder;
   an outer shell structure disposed about said cylinder, said outer shell structure being formed of a thin-walled shell, said thin-walled shell having a constant thickness over a length thereof, said outer shell cooperating with said cylinder to enclose an outside of said cylinder to form a reservoir chamber between said cylinder and said outer shell;
   a knuckle bracket connected to an outer periphery of said outer shell, said knuckle bracket extending over said outer shell from a lower end portion to a location corresponding to a knuckle bracket upper end;
   a bottomed cylinder including a cylindrical portion and a bottom portion, said bottomed cylinder being fitted within an interior of said outer shell extending from said lower end portion to said location corresponding to said knuckle bracket upper end, said bottom cylinder being welded together with said outer shell and said knuckle bracket.

2. A shock absorber according to claim 1, wherein the bottom portion of the bottomed cylinder forms a lower cap at a lower end of the cylinder.

3. A shock absorber according to claim 1, wherein an inner periphery of a lower end portion of said knuckle bracket, the lower end of said outer shell and an outer periphery of the bottom of said bottomed cylinder are bonded together by welding.

4. A shock absorber, comprising:
   a cylinder;
   a piston provided with a damping force generating mechanism;
   a piston rod with said piston mounted thereto, said piston rod being moved into and out of said cylinder, said piston partitioning an interior of said cylinder into a rod-side chamber and a piston-side chamber;

a base valve provided in an open end of said piston-side chamber of said cylinder;

an outer shell structure disposed about said cylinder, said outer shell structure being formed of a thin-walled shell, said thin-walled shell having a constant thickness over a length thereof, said outer shell cooperating with said cylinder to enclose an outside of said cylinder to form a reservoir chamber between said cylinder and said outer shell;

a knuckle bracket connected to an outer periphery of said outer shell, said knuckle bracket extending over said outer shell from a lower end portion to a location corresponding to a knuckle bracket upper end;

a bottomed cylinder including a cylindrical portion and a bottom portion, said bottomed cylinder being fitted within an interior of said outer shell extending from said lower end portion to said location corresponding to said knuckle bracket upper end, said bottom cylinder being welded together with said outer shell and said knuckle bracket, said bottomed cylinder cylindrical portion is provided with first and second cut-outs extending from said cylindrical portion upper edge to a location above said bottom, said cutouts being disposed opposite each other centered on a line perpendicular to a line of a bending moment applied to said outer shell by said knuckle bracket.

* * * * *